United States Patent [19]

Jacob

[11] 4,271,720

[45] Jun. 9, 1981

[54] ADJUSTABLE-STROKE CRANK APPARATUS

[75] Inventor: Charles W. Jacob, Pittsburgh, Pa.

[73] Assignee: United States Steel Corporation, Pittsburgh, Pa.

[21] Appl. No.: 83,056

[22] Filed: Oct. 9, 1979

[51] Int. Cl.³ .............................................. F16C 3/04
[52] U.S. Cl. ...................................... 74/600; 74/603
[58] Field of Search ................ 74/600, 571 R, 571 L, 74/571 M, 117, 590, 603

[56] References Cited

U.S. PATENT DOCUMENTS

| | | |
|---|---|---|
| 421,297 | 2/1890 | Mills ....................................... 74/600 |
| 1,779,981 | 10/1930 | Nickerson . |
| 2,256,605 | 9/1941 | Bier ........................................ 74/603 |
| 2,668,726 | 2/1954 | Stewart et al. ........................ 403/359 |
| 2,838,956 | 6/1958 | Schneider .............................. 74/600 |
| 3,161,067 | 12/1964 | Moller . |

FOREIGN PATENT DOCUMENTS 2409358 2/1974 Fed. Rep. of Germany .

Primary Examiner—Kenneth Dorner
Attorney, Agent, or Firm—William F. Riesmeyer, III

[57] ABSTRACT

An apparatus for adjusting the stroke length of a crank rod includes a pair of plates having adjoining broad faces mounted on one of the faces of a flywheel. A crankpin or other means is located on the exposed part of the outer plate for connection of the crank rod. One of the plates has a spline member which is located off center with respect to the flywheel axis. The other plate has a grooved portion mateable with the spline member. The outer plate is detachably connected to the inner one and may be rotated with respect thereto, and then reconnected to provide positive change of the stroke length of the crank rod.

6 Claims, 2 Drawing Figures

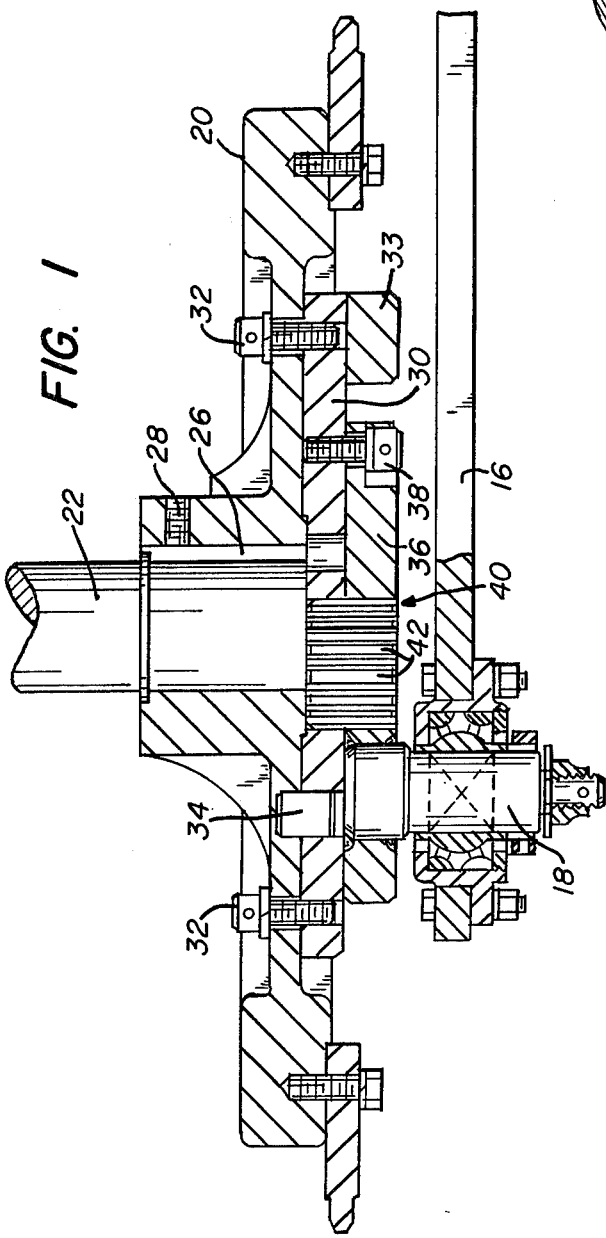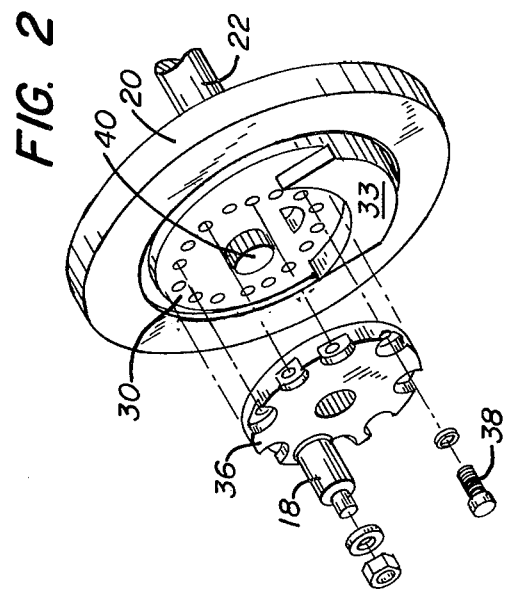

4,271,720

ADJUSTABLE-STROKE CRANK APPARATUS

BACKGROUND OF THE INVENTION

This invention relates to apparatus for changing the stroke length of a crank rod driven by a flywheel, and particularly to such apparatus as used in heavy equipment, for example vibratory coal feeders or the like.

One type of coal or ore feeder commonly in use, has a sliding floorplate which reciprocates back and forth so as to feed material gradually to a container or perhaps a conveyor. The drive mechanism for the feeder includes a pair of crank rods journaled on a cross shaft on opposite sides of the floorplate and a second cross shaft having a pair of spaced flywheels for driving the rods back and forth. Usually the stroke length of the crank rods is adjustable so that the rate of feeding the material may be varied. One type of adjustment may include a pair of movable gear racks mounted on each flywheel with the respective crank pins clamped therebetween. The operator makes the adjustments and measures the distance of each of the crankpins from the flywheel axis. This leaves room for measurement and other human errors which cause unequal stroke of the two crank rods and, along with the lack of adequate support for the crank pins themselves has resulted in breakage, particularly when the equipment is started up in cold weather.

Various other types of stroke adjustment apparatus are known as shown in U.S. Pat. No. 3,161,067 Moller and U.S. Pat. No. 1,779,981 Nickerson. However, I am not aware of any apparatus which will provide positive accurate adjustment of crank length stroke and which will solve the above problems. I also do not know of any available apparatus which will provide positive accurate positioning of the crank rods attached to two or more spaced separate flywheels mounted on one shaft.

It is therefore a primary object of this invention to provide apparatus for positive adjustment of the stroke length of a crank rod to prescribed positions.

A further object is to provide apparatus for positive adjustment of crank rods on two or more separate flywheels mounted on a shaft.

Still another object is to provide apparatus for adjusting the stroke length of a crank rod which is not subject to breakage.

SUMMARY OF THE INVENTION

The apparatus of this invention includes a first plate secured to a flywheel with a broad face of the plate adjoining a broad face of the flywheel. A second plate is detachable connected to the first, with broad faces of the two adjoining each other. Means is provided on the exposed part of the second plate for connection of the crank rod. A spline member integral with or secured to one of the plates is located so as to be off center with respect to the axis of the flywheel. The spline has a plurality of spaced protruding keys which are mateably engageable by a grooved portion of the other of the plates. Thus, the second plate may be detached from and rotated about a transverse axis with respect to the first plate, and reconnected thereto so that the stroke length of the crank rod is changed. Preferably means if provided for aligning the first plate accurately with respect to the flywheel, thus assuring proper alignment of two or more crank rods attached to separate spaced flywheels on a shaft, each having the apparatus of this invention mounted thereon.

BRIEF DESCRIPTION OF THE DRAWINGS

FIG. 1 is a cross sectional view of a flywheel apparatus having the improved adjustment mechanism of the invention applied thereto.

FIG. 2 is an exploded perspective view of the apparatus of FIG. 1.

DESCRIPTION OF THE PREFERRED EMBODIMENT

Although not limited thereto, the apparatus of this invention will be described as applied on a coal feeder of the type manufactured and sold by Kanawha Corporation of Charleston, W.Va. Such a feeder (partially shown in FIG. 1) has a slidable floorplate (not shown) attached to a bracket which is mounted on a shaft. Crank rod 16 is journaled at one end on a shaft to which the floorplate is connected and at the other on crankpin 18. The crankpin and crank rod are driven by flywheel 20 mounted on one end of shaft 22. A key (not shown) is inserted in key way 26 to secure the flywheel to the shaft, and in turn may be additionally secured by a set screw inserted in threaded opening 28. Only one end of the shaft 22 is shown, since the other end, including the apparatus of this invention applied thereto, is identical.

The apparatus of this invention includes a first plate 30 (FIGS. 1 and 2) in the form of a disc secured by bolts 32 to the face of flywheel 20. A counterweight 33 is attached to the first plate. Pin 34 serves to align first plate 30 accurately in prescribed position on the flywheel. A mark or other indicia on the flywheel and first plate may also serve the same purpose, but I prefer to use a pin since the plate cannot be mounted on the flywheel unless the plate opening is properly aligned with the pin. Second plate 36 is detachably connected to the first plate by bolts 38. Spline member 40 preferably welded to plate 36, has a plurality of keys 42 mateably engageable at various rotative positions with a grooved portion of first plate 30. Preferably the keys are equally spaced although other configurations are possible. Of course the holes for bolts 38 must be located at positions corresponding to the various rotative positions of the two plates. Conceivably the keys may have axes normal to or at other angles of intersection with the axis of the spline member as well as parallel thereto as shown. Of course the keys themselves may be of any shape cross section. In addition, other means of connecting the plates may be used for example, such as shown in U.S. Pat. No. 1,779,981 Nickerson, the specification of which is incorporated herein, however, I prefer to use the bolting method I have described for heavy equipment.

I claim:

1. In a motion conversion apparatus, said apparatus including a flywheel, a crank rod, and means connecting said crank rod to the flywheel, said connecting means being adjustable so that the stroke length of the crank rod may be varied, the improvement in said adjustable connecting means which comprises:

a first plate secured to said flywheel and having a broad face thereof adjacent a broad face of said flywheel, a second plate having a broad face thereof adjacent the face of the first plate opposite said flywheel and means attached thereto on the broad face opposite said first plate for connecting said crank rod thereto, a spline member mounted in fixed position on one of said plates and having a plurality of keys protruding therefrom, said spline member having an axis displaced from the axis of the flywheel, the other of said plates having a grooved portion mateably engageable with said spline member at any of a plurality of rotative positions of said second plate with respect to the first about a transverse axis thereof, and means detachably connecting said plates together at any said positions so that the stroke length of said crank rod may be made positively.

2. The apparatus of claim 1 wherein the keys on said spline member are equally spaced.

3. The apparatus of claim 1 further comprising means for positioning said first plate accurately on the face of said flywheel during installation thereof.

4. The apparatus of claim 1 wherein said first and second plates are circular discs.

5. The apparatus of claim 4 wherein said first plate has a balance counterweight thereon.

6. The apparatus of claim 4 wherein said plates have a plurality of mateably aligned holes spaced along their outer periphery, said holes being at locations equivalent to the plurality of angular positions to which the second plate may be rotated, and the connecting means includes bolts inserted in said holes.

* * * * *